UNITED STATES PATENT OFFICE.

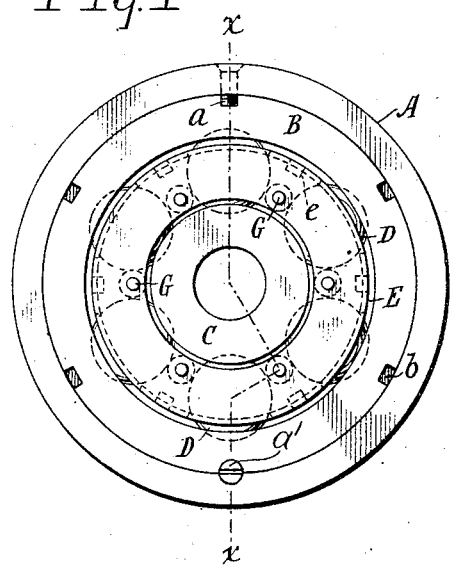
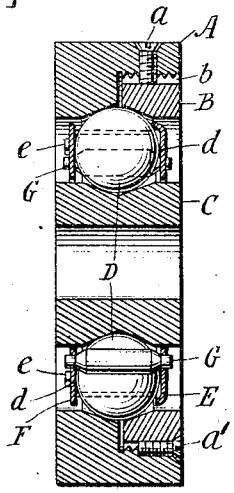
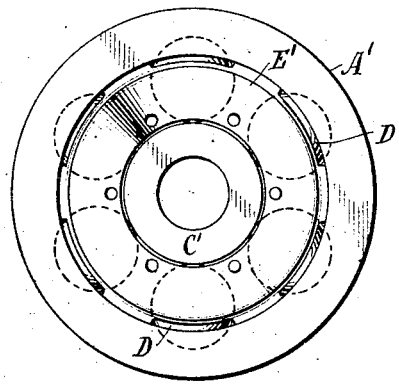
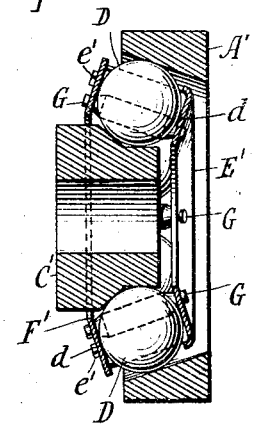
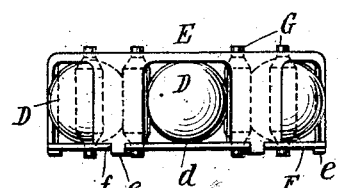

GEORGE J. S. COLLINS, OF OMAHA, NEBRASKA.

ROLLER-BEARING.

951,177.

Specification of Letters Patent. Patented Mar. 8, 1910.

Application filed July 10, 1907. Serial No. 383,022.

*To all whom it may concern:*

Be it known that I, GEORGE J. S. COLLINS, a citizen of the United States, residing at Omaha, in the county of Douglas and State of Nebraska, have invented certain new and useful Improvements in Roller-Bearings, of which the following is a specification.

My invention relates to improvements in roller bearings and refers more specifically to improvements in the arrangement of the roller elements with respect to a removable cage in which the balls are collectively and movably retained.

The object of the invention is to provide a construction wherein the roller elements are so arranged with relation to the caging that they contact with it at their axes of rotation only, and a simplified means of adjustment.

The invention consists in the matters hereinafter set forth and more particularly pointed out in the appended claims, and the same will be more readily understood by reference to the accompanying drawings, in which—

Figure 1 is a side view of my invention showing the adjustable cone. Fig. 2 is a vertical section on indirect line X—X of Fig. 1. Fig. 3 is a side view of the construction of a bearing in which the bearing angles are somewhat changed from those shown in Fig. 1. Fig. 4 is a vertical section through the center of Fig. 3. Fig. 5 is a top view of a caging having the form shown in Fig. 2.

Referring to the drawings, A designates an outer ring turned to a suitable angle upon which the main supporting roller elements or balls revolve.

B is an annular cone in Fig. 1, turned to a suitable angle to complete the annular race upon which the main supporting roller elements or balls revolve and is threaded to fit within the ring A.

Letter C designates the collar through which the axle is installed.

The main supporting roller elements or balls which revolve on the bearing surfaces of the ring A and cone B are marked D.

The cage comprises the main annular body E, having portions formed up between the balls near their peripheries so as to engage the annular plate F on the opposite side of the main supporting roller elements or balls, the connection being made by turning down bendable tips e of the body E, into recesses f in the edge of plate F, as shown in Fig. 5. The portions of body E formed up between the balls also fix the space between the body E and plate F. If desired, however, the connecting arms of the body E may be omitted and the two parts riveted together by distance studs in a manner well known in the art. The letters d, d, mark the points on the axes of rotation of the main supporting roller elements or balls where they contact with the caging.

The cylindrical rollers or separators G placed between the balls to separate them and keep them from contacting, thereby eliminate the friction between the balls. These separators are turned off to a smaller diameter at their ends and are journaled through the caging as indicated in the drawings.

The operation of the bearing may be thus described: Assume that the inner ring C is attached to an axle which is stationary and that the rings A and B revolve in a clockwise direction from left to right, the main supporting rollers will also travel in the same direction, but while one side of the ball is descending, the other side is ascending, therefore, if the main supporting rollers or balls were contacting, their opposing faces would be taking opposite directions. In order to eliminate the friction caused by this opposing motion, the small rolling separators marked G are placed between the balls, and as they are not in contact with either bearing surface, they are free to rotate in the direction given them by their contact with the balls, and they thus rotate in the opposite direction to the balls and travel contra-clockwise, or from right to left. In Fig. 2 the axes of rotation of the balls are horizontal and they contact on each side with the cage at points d, d. On these axes there is no movement of the balls, thus the caging is kept from lateral movement by means of this contact with the balls without any friction which might be caused by the balls contacting with the caging at any other points than at their axes of rotation. In Fig. 4 the axes of rotation of the balls are on a line passing through their centers parallel to the inner surface or race of the outer ring A', thus the points of contact in this construction which are on the axes of rotation, are at points d, d. It will thus be seen that by any combination of the angles of races, the caging can be so constructed as to touch the main supporting roller elements or balls at points on their axes of rotation only. Within the outer ring A' is the collar C' externally shaped to afford a runway for the balls D. The front of the body E' of the cage slopes inwardly from all points of its periphery toward the axis of collar C', and the rear side F' of the cage is parallel with the front. The front and rear of the cage are joined by the connecting and spacing portions e'. The screw marked a, is threaded into the outer collar A and engages holes or grooves b in the collar B. The same adjustment may be made by threading the screw a' into the slots in the joint between parts A and B and engaging both rings. This is a style of adjustment by means of which the bearing can be very finely adjusted.

I claim as my invention—

1. In a roller bearing, a cage having spaced parallel sides, balls located between the sides of the cage, the diameter of the balls being equal to the internal width of the cage, whereby the balls touch the sides of the cage at diametrically opposite points, the said cage having openings through which the balls may project in a direction from the center, the said openings being less in size than the balls, the space between said sides toward the center being continuously open, and spacing rollers engaging the sides of the cage between the balls and retaining the balls, the balls projecting between the rollers and toward the center beyond the edges of said sides of the cage.

2. In a roller bearing, a revoluble two-part cage comprising as one part a flat annular side, and as the other part a body having a flat annular side corresponding to and arranged parallel with the flat side first mentioned, the said body having spacing and connecting portions adapted to suitably separate the annular sides, balls arranged between the said sides, the space between the said sides being approximately equal to the diameter of the balls, and revoluble spacing devices located between the balls, the said spacing portions of the body and said revoluble spacing devices being adapted to retain the balls in the cage, substantially as described.

In testimony whereof I affix my signature in presence of two witnesses.

GEORGE J. S. COLLINS.

Witnesses:
ARNOLD C. KOENIG,
CHARLES W. PEARSALL.